(12) United States Patent
Zhang

(10) Patent No.: US 9,577,930 B2
(45) Date of Patent: Feb. 21, 2017

(54) METHOD FOR DETERMINING MULTICAST PATH, METHOD FOR RECEIVING DATA PACKET, AND ROUTER

(71) Applicant: HUAWEI TECHNOLOGIES CO., LTD., Shenzhen, Guangdong (CN)

(72) Inventor: Zhongjian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 14/448,020

(22) Filed: Jul. 31, 2014

(65) Prior Publication Data

US 2014/0341216 A1    Nov. 20, 2014

Related U.S. Application Data

(63) Continuation of application No. PCT/CN2012/086983, filed on Dec. 20, 2012.

(30) Foreign Application Priority Data

Feb. 1, 2012    (CN) .......................... 2012 1 0022349

(51) Int. Cl.
*H04L 12/28* (2006.01)
*H04L 12/56* (2006.01)
(Continued)

(52) U.S. Cl.
CPC ........... *H04L 45/741* (2013.01); *H04L 12/185* (2013.01); *H04L 45/122* (2013.01); *H04L 45/16* (2013.01);
(Continued)

(58) Field of Classification Search
CPC ...... H04L 45/741; H04L 45/122; H04L 45/52; H04L 45/16; H04L 61/251
(Continued)

(56) References Cited

U.S. PATENT DOCUMENTS

| 2002/0004846 A1* | 1/2002 | Garcia-Luna-Aceves | G06F 12/1483 709/245 |
| 2003/0073453 A1* | 4/2003 | Basilier | H04L 12/185 455/503 |

(Continued)

FOREIGN PATENT DOCUMENTS

| CN | 1992707 A | 7/2007 |
| CN | 101383757 A | 3/2009 |

(Continued)

OTHER PUBLICATIONS

Extended and Supplementary European Search Report issued on Nov. 4, 2014 in corresponding European Patent Application No. 12867024.7.

(Continued)

*Primary Examiner* — Sai-Ming Chan
(74) *Attorney, Agent, or Firm* — Staas & Halsey LLP

(57) ABSTRACT

Embodiments of the present invention relate to a method for determining a multicast path, a method for receiving a data packet, and a router. The method for determining a multicast path includes: receiving, by a multicast address translation router, a first multicast join request packet, where the first multicast join request packet is an IPV4 packet, or the first multicast join request packet is an Internet Protocol version 6 IPV6 packet and a multicast address of the first multicast join request packet is an IPV6 multicast address obtained by performing Internet Protocol version translation on an IPV4 multicast address; and determining a shorter path between a first path and a second path. The multicast address translation router may determine the shorter path between the first path and the second path, thereby implementing a method for selecting a shorter path from the paths of different network types, which improves multicast efficiency.

24 Claims, 9 Drawing Sheets

(51) Int. Cl.
*H04L 12/18* (2006.01)
*H04L 29/12* (2006.01)
*H04L 12/733* (2013.01)
*H04L 12/781* (2013.01)
*H04L 12/761* (2013.01)
*H04L 29/06* (2006.01)

(52) U.S. Cl.
CPC ............. *H04L 45/52* (2013.01); *H04L 61/251* (2013.01); *H04L 61/2542* (2013.01); *H04L 69/14* (2013.01)

(58) Field of Classification Search
USPC .......................................................... 370/390
See application file for complete search history.

(56) References Cited

U.S. PATENT DOCUMENTS

| | | | | |
|---|---|---|---|---|
| 2007/0005804 | A1* | 1/2007 | Rideout | H04L 12/1822 709/246 |
| 2007/0153791 | A1 | 7/2007 | Zheng et al. | |
| 2007/0171930 | A1 | 7/2007 | Kamata et al. | |
| 2008/0059581 | A1* | 3/2008 | Pepperell | H04L 12/1827 709/204 |
| 2010/0079575 | A1* | 4/2010 | Ali | H04N 7/148 348/14.13 |
| 2010/0254383 | A1 | 10/2010 | Fernandez et al. | |
| 2013/0279518 | A1* | 10/2013 | Sarikaya | H04L 29/06068 370/467 |

FOREIGN PATENT DOCUMENTS

| | | |
|---|---|---|
| CN | 101383834 A | 3/2009 |
| CN | 101394298 | 3/2009 |
| CN | 101710861 A | 5/2010 |
| CN | 102088494 A | 6/2011 |

OTHER PUBLICATIONS

PCT International Search Report issued on Mar. 28, 2013 in corresponding International Patent Application No. PCT/CN2012/086983.

Fenner et al., "Protocol Independent Multicast—Sparse Mode (PIM-SM): Protocol Specification (Revised)", Network Working Group, 2006, pp. 1-112.

Lee et al., "IPv4/IPv6 Multicast Translation Framework draft-lee-behave-v4v6-mcast-fwk-00", Behave Working Group, Feb. 21, 2011, pp. 1-46.

Wang et al., "Multicast Extensions to DS-Lite Technique in Broadband Deployments draft-qin-softwire-dslite-multicast-04", Softwire WG, Jun. 13, 2011, pp. 1-20.

Boucadair et al., "IPv4-Embedded IPv6 Multicast Address Format draft-boucadair-behave-64-multicast-address-format-02", Behave WG, Jun. 24, 2011, 15 Pages.

Durand et al., "Dual-Stack Lite Broadband Deployments Following IPv4 Exhaustion", Internet Engineering Task Force (IETF), Aug. 2011, pp. 1-32.

Wang et al., "Multicast Extensions to DS-Lite Technique in Broadband Deployments draft-ietf-softwire-dslite-multicast-00", Softwire WG, Sep. 10, 2011, pp. 1-20.

Bao et al., "IPv6 Addressing of IPv4/IPv6 Translators", Internet Engineering Task Force (IETF), Oct. 2010, pp. 1-18.

Jacquenet et al., "IPv4-IPv6 Multicast: Problem Statement and Use Cases draft-jaclee-behave-v4v6-mcast-ps-03", Behave Working Group, Nov. 2, 2011, 23 Pages.

International Search Report mailed Mar. 28, 2013, in corresponding International Patent Application No. PCT/CN2012/086983.

Chinese Office Action dated Jul. 1, 2015 in corresponding Chinese Patent Application No. 201210022349.6.

* cited by examiner

METHOD FOR DETERMINING MULTICAST PATH, METHOD FOR RECEIVING DATA PACKET, AND ROUTER

CROSS-REFERENCE TO RELATED APPLICATION

This application is a continuation of International Application No. PCT/CN2012/086983, filed on Dec. 20, 2012, which claims priority to Chinese Patent Application No. 201210022349.6, filed on Feb. 01, 2012, both of which are hereby incorporated by reference in their entireties.

TECHNICAL FIELD

Embodiments of the present invention relate to the communications field, and in particular, to a method for determining a multicast path, a method for receiving a data packet, and a router.

BACKGROUND

In the prior art, an Internet Protocol version 6 (fully spelled as Internet Protocol version 6 in English, and referred to as IPv6 for short in English) multicast address constructed by using an Internet Protocol version 4 (fully spelled as Internet Protocol version 4 in English, and referred to as IPv4 in English) multicast address may be used as a destination address of a unidirectional multicast data stream in an IPv4-in-IPv6 encapsulation mode, and an IPv6 address of a multicast source may be constructed by using an IPv4 unicast address of the multicast source according to a format defined in RFC6052, so that a multicast Basic Bridging BroadBand (fully spelled as Multicast Basic Bridging BroadBand in English, and referred to as mB4 for short in English) device or a customer premise equipment (fully spelled as Customer Premise Equipment in English, and referred to as CPE for short in English) in an access network can receive a multicast packet in a network in which an IPv4 node and an IPv6 node are located. The mB4 device is responsible for decapsulating a received IPv4-in-IPv6 multicast packet, and forwarding an IPv4 multicast data stream to an IPv4 receiver, for example, a set-top box (fully spelled as Set Top Box in English, and referred to as STB for short in English).

In addition, a multicast address translation router is a node in a dual-stack network and processes a Protocol Independent Multicast (fully spelled as Protocol Independent Multicast in English, and referred to as PIM for short in English) join request packet, a Multicast Listener Discovery (fully spelled as Multicast Listener Discover in English, and referred to as MLD for short) join request packet, or an Internet Group Management Protocol (fully spelled as Internet Group Management Protocol in English, and referred to as IGMP for short in English) join request packet. For example, the multicast address translation router checks whether a joining IPv6 multicast address belongs to a certain mPrefix64 (prefix information of IPv6), that is, checks whether it is an IPv4 multicast address in an IPv4-in-IPv6 encapsulation mode; moreover, the multicast address translation router is responsible for copying an IPv4 multicast data stream to an IPv6 domain, and sending the IPv4 multicast data stream in an IPv6 network in the IPv4-in-IPv6 encapsulation mode.

Generally, for the objectives of reliability and load balancing, several nodes (for example, an IPv4 node or an IPv6 node) in a network may be embedded with a function of the multicast address translation router. In this case, each multicast address translation router creates an IPv4-in-IPv6 multicast packet by using a same multicast prefix mapping rule and unicast prefix mapping rule.

In a dual-stack network, the multicast address translation router belongs to an IPv4 multicast distribution tree; however, a path from the multicast address translation router to an IPv4 source is not necessarily on a reverse shortest path distribution tree of the source. As a result, a multicast distribution tree path selected in the prior art may not be an optimal multicast distribution path, causing low efficiency of multicast stream transmission and transmission delay.

SUMMARY

An objective of embodiments of the present invention is to provide a method for determining a multicast path, a method for receiving a data packet, and a router.

The technical solutions of the embodiments of the present invention include the following content:

A method for determining a multicast path includes:

receiving, by a multicast address translation router, a first multicast join request packet, where the first multicast join request packet is an Internet Protocol version 4 IPv4 packet and a multicast address of the first multicast join request packet is an IPv4 multicast address, or the first multicast join request packet is an Internet Protocol version 6 IPv6 packet and a multicast address of the first multicast join request packet is an IPv6 multicast address obtained by performing Internet Protocol version translation on an IPv4 multicast address; and determining, by the multicast address translation router, a shorter path between a first path and a second path, where the first path is a path between an IPv4 interface of the multicast address translation router and a multicast data providing node corresponding to the first multicast join request packet, and the second path is a path between an IPv6 interface of the multicast address translation router and the multicast data providing node corresponding to the first multicast join request packet.

A method for receiving a multicast data packet includes:

receiving, by a multicast address translation router, a first multicast data packet from a multicast data providing node through a first path, where the first path is a path between an Internet Protocol version 4 IPv4 interface of the multicast address translation router and the multicast data providing node;

receiving, by the multicast address translation router, a second multicast data packet from the multicast data providing node through a second path, where the second path is a path between an Internet Protocol version 6 IPv6 interface of the multicast address translation router and the multicast data providing node, and a multicast address of the second multicast data packet may be obtained by performing Internet Protocol version translation on a multicast address of the first multicast data packet;

determining a shorter path and a non-shorter path between the first path and the second path; and sending, by the multicast address translation router, a prune message to the multicast data providing node along the non-shorter path.

A multicast address translation router includes:

a receiving unit, configured to receive a first multicast join request packet, where the first multicast join request packet is an Internet Protocol version 4 IPv4 packet and a multicast address of the first multicast join request packet is an IPv4 multicast address, or the first multicast join request packet is an Internet Protocol version 6 IPv6 packet and a multicast address of the first multicast join request packet is an IPv6 multicast address obtained by performing Internet Protocol version translation on an IPv4 multicast address; and a shorter-path determining unit, configured to determine a shorter path between a first path and a second path, where the first path is a path between an IPv4 interface of the multicast address translation router and a multicast data providing node corresponding to the first multicast join request packet, and the second path is a path between an IPv6 interface of the multicast address translation router and the multicast data providing node corresponding to the first multicast join request packet.

A multicast address translation router includes:

a first multicast data packet receiving unit, configured to receive a first multicast data packet from a multicast data providing node through a first path, where the first path is a path between an Internet Protocol version 4 IPv4 interface of the multicast address translation router and the multicast data providing node;

a second multicast data packet receiving unit, configured to receive a second multicast data packet from the multicast data providing node through a second path, where the second path is a path between an Internet Protocol version 6 IPv6 interface of the multicast address translation router and the multicast data providing node, and a multicast address of the second multicast data packet may be obtained by performing Internet Protocol version translation on a multicast address of the first multicast data packet;

a shorter-path determining unit, configured to determine a shorter path and a non-shorter path between the first path and the second path; and a pruning unit, configured to send a prune message to the multicast data providing node along the non-shorter path.

An advantage of the embodiments of the present invention is that the multicast address translation router may determine a shorter path between a first path and a second path after receiving an IPv4 or IPv6 multicast join request packet, where all or part of the first path and the second path separately belong to different network types, thereby implementing a method for selecting a shorter path from the paths of different network types, which improves multicast efficiency.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In addition, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1 of the Present Invention

Figure 1:
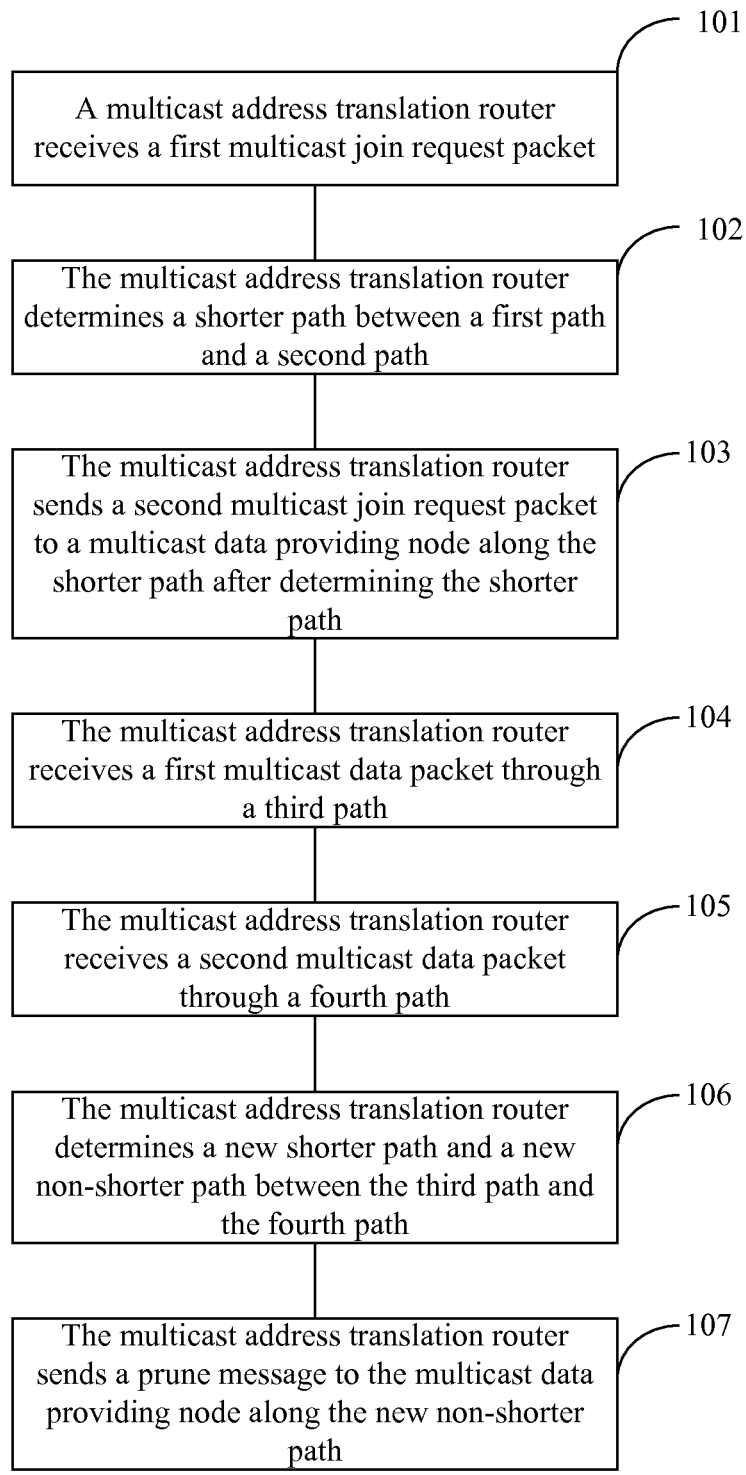
FIG. 1 is a schematic diagram of a method according to an embodiment of the present invention.

FIG. 1 is a schematic diagram of a method according to an embodiment of the present invention.

101. A multicast address translation router receives a first multicast join request packet, where the first multicast join request packet is an Internet Protocol version 4 (fully spelled as Internet Protocol version 4 in English, and referred to as IPv4 for short in English) packet and a multicast address of the first multicast join request packet is an IPv4 multicast address, or the first multicast join request packet is an Internet Protocol version 6 (fully spelled as Internet Protocol version 6 in English, and referred to as IPv6 for short in English) packet and a multicast address of the first multicast join request packet is an IPv6 multicast address obtained by performing Internet Protocol version translation on an IPv4 multicast address.

102. The multicast address translation router determines a shorter path between a first path and a second path, where the first path is a path between an IPv4 interface of the multicast address translation router and a multicast data providing node corresponding to the first multicast join request packet, and the second path is a path between an IPv6 interface of the multicast address translation router and the multicast data providing node corresponding to the first multicast join request packet.

Optionally, the IPv4 interface of the multicast address translation router refers to a physical interface or a virtual interface connected to the multicast data providing node by using a data signal cable, and a distance between the IPv4 interface of the multicast address translation router and the multicast data providing node is not infinite. In a network shown in FIG. 2, an interface 11 is the IPv4 interface of the multicast address translation router.

The IPv6 interface of the multicast address translation router refers to a physical interface or a virtual interface connected to the multicast data providing node by using a data signal cable, and a distance between the IPv6 interface of the multicast address translation router and the multicast data providing node is not infinite. In the network shown in FIG. 2, an interface 12 is the IPv6 interface of the multicast address translation router.

Optionally, the shorter path is determined according to path parameters.

Optionally, the path parameters include a distance of the first path, a distance of the second path, and a translation distance generated when the multicast address translation router performs Internet Protocol (IP) translation on a multicast packet. Optionally, when the first multicast join request packet is the IPv6 packet and the multicast address of the first multicast join request packet is the IPv6 multicast address obtained by performing the Internet Protocol version translation on the IPv4 multicast address, the determining of the shorter path between the first path and the second path by the multicast address translation router includes: determining a distance calculation value of the first path according to the distance of the first path and the translation distance, for example, adding the distance of the first path to the translation distance to obtain the distance calculation value of the first path; and determining the shorter path between the first path and the second path according to the distance calculation value of the first path and the distance of the second path, for example, comparing the distance calculation value of the first path with the distance of the second path, and if the distance calculation value of the first path is less than the distance of the second path, determining the first path as the shorter path. Optionally, when the first multicast join request packet is the IPv4 packet and the multicast address of the first multicast join request packet is the IPv4 multicast address, the determining of the shorter path between the first path and the second path by the multicast address translation router includes: determining a distance calculation value of the second path according to the distance of the second path and the translation distance; and determining the shorter path between the first path and the second path according to the distance calculation value of the second path and the distance of the first path.

Optionally, the path parameters include an overhead of the first path, an overhead of the second path, and a translation overhead generated when the multicast address translation router performs Internet Protocol (IP) translation on a multicast packet. Optionally, when the first multicast join request packet is the IPv6 packet and the multicast address of the first multicast join request packet is the IPv6 multicast address obtained by performing the Internet Protocol version translation on the IPv4 multicast address, the determining of the shorter path between the first path and the second path by the multicast address translation router includes: determining an overhead calculation value of the first path according to the overhead of the first path and the translation overhead, for example, adding the overhead of the first path to the translation overhead to obtain the overhead calculation value of the first path; and determining the shorter path between the first path and the second path according to the overhead calculation value of the first path and the overhead of the second path, for example, comparing the overhead calculation value of the first path with the overhead of the second path, and if the overhead calculation value of the first path is less than the overhead of the second path, determining the first path as the shorter path. Optionally, when the first multicast join request packet is the IPv4 packet and the multicast address of the first multicast join request packet is the IPv4 multicast address, the determining of the shorter path between the first path and the second path by the multicast address translation router includes: determining an overhead calculation value of the second path according to the overhead of the second path and the translation overhead; and determining the shorter path between the first path and the second path according to the overhead calculation value of the second path and the overhead of the first path.

Optionally, the path parameters include a distance of the first path, a distance of the second path, a translation distance generated when the multicast address translation router performs Internet Protocol (IP) translation on a multicast packet, an overhead of the first path, an overhead of the second path, and a translation overhead generated when the multicast address translation router performs the Internet Protocol (IP) translation on the multicast packet. Optionally, when the first multicast join request packet is the IPv6 packet and the multicast address of the first multicast join request packet is the IPv6 multicast address obtained by performing the Internet Protocol version translation on the IPv4 multicast address, the determining of the shorter path between the first path and the second path by the multicast address translation router includes: determining a distance calculation value of the first path according to the distance of the first path and the translation distance; determining an overhead calculation value of the first path according to the overhead of the first path and the translation overhead; determining a first comprehensive calculation value according to the distance calculation value of the first path and the overhead calculation value of the first path; determining a second comprehensive calculation value according to the distance of the second path and the overhead of the second path; and determining the shorter path between the first path and the second path according to the first comprehensive calculation value and the second comprehensive calculation value. Optionally, when the first multicast join request packet is the IPv4 packet and the multicast address of the first multicast join request packet is the IPv4 multicast address, the determining of the shorter path between the first path and the second path by the multicast address translation router includes: determining a first comprehensive calculation value according to the distance of the first path and the overhead of the first path; determining a distance calculation value of the second path according to the distance of the second path and the translation distance; determining an overhead calculation value of the second path according to the overhead of the second path and the translation overhead; determining a second comprehensive calculation value according to the distance calculation value of the second path and the overhead calculation value of the second path; and determining the shorter path between the first path and the second path according to the first comprehensive calculation value and the second comprehensive calculation value.

When the path parameters include the distance of the first path, the distance of the second path, the translation distance generated when the multicast address translation router performs the Internet Protocol (IP) translation on the multicast packet, the overhead of the first path, the overhead of the second path, and the translation overhead generated when the multicast address translation router performs the Internet Protocol (IP) on the multicast packet, the shorter path may be determined first according to the distance of the first path, the distance of the second path, and the translation distance generated when the multicast address translation router performs the Internet Protocol (IP) translation on the multicast packet; when the distance of the first path and the distance of the second path are the same, the shorter path is then determined according to the overhead of the first path, the overhead of the second path, and the translation overhead generated when the multicast address translation router performs the Internet Protocol (IP) translation on the multicast packet. It is also allowed that: the shorter path is determined first according to the overhead of the first path, the overhead of the second path, and the translation overhead generated when the multicast address translation router performs the Internet Protocol (IP) translation on the multicast packet; when the overhead of the first path and the overhead of the second path are the same, the shorter path is then determined according to the distance of the first path, the distance of the second path, and the translation distance generated when the multicast address translation router performs the Internet Protocol (IP) translation on the multicast packet.

Optionally, the distance of the first path and/or the overhead of the first path are (is) carried by a Protocol Independent Multicast Assert (fully spelled as PIM Assert in English) packet received by the IPv4 interface. Optionally, the PIM Assert packet is generated by the multicast data providing node, and is forwarded to the IPv4 interface along the first path in a hop by hop manner. Each time the PIM Assert packet is forwarded, the distance of the first path and/or the overhead of the first path carried in the PIM Assert packet are (is) correspondingly increased one time. In this way, when the PIM Assert packet is received by the IPv4 interface, the distance of the first path and/or the overhead of the first path may be determined When the first path is a mixed path that includes an IPv4 path segment and an IPv6 path segment, the distance of the first path may further include a translation distance between the IPv4 path segment and the IPv6 path segment, or may not include the translation distance between the IPv4 path segment and the IPv6 path segment; the overhead of the first path may further include a translation overhead between the IPv4 path segment and the IPv6 path segment, or may not include the translation overhead between the IPv4 path segment and the IPv6 path segment.

Optionally, the distance of the second path and/or the overhead of the second path are (is) carried by a Protocol Independent Multicast Assert (fully spelled as PIM Assert in English) packet received by the IPv6 interface. Optionally, the PIM Assert packet is generated by the multicast data providing node, and is forwarded to the IPv6 interface along the second path in a hop by hop manner. Each time the PIM Assert packet is forwarded, the distance of the second path and/or the overhead of the second path carried in the PIM Assert packet are (is) correspondingly increased one time. In this way, when the PIM Assert packet is received by the IPv6 interface, the distance of the second path and/or the overhead of the second path may be determined When the second path is a mixed path that includes an IPv4 path segment and an IPv6 path segment, the distance of the second path may further include a translation distance between the IPv4 path segment and the IPv6 path segment, or may not include the translation distance between the IPv4 path segment and the IPv6 path segment; the overhead of the second path may further include a translation overhead between the IPv4 path segment and the IPv6 path segment, or may not include the translation overhead between the IPv4 path segment and the IPv6 path segment.

Optionally, the translation distance and/or translation overhead are (is) determined by the multicast address translation router, or the translation distance and/or translation overhead are (is) preconfigured in the multicast address translation router.

Optionally, the multicast data providing node is a multicast source node or an aggregation node. Optionally, when the first multicast join request packet carries a multicast address but does not carry a multicast source address, the multicast data providing node is the multicast source node.

Optionally, when the first multicast join request packet carries a multicast address and multicast source address, the multicast data providing node is the aggregation node.

In this embodiment, the multicast address translation router may determine a shorter path between a first path and a second path after receiving an IPv4 or IPv6 multicast join request packet, where all or part of the first path and the second path separately belong to different network types, thereby implementing a method for selecting a shorter path from the paths of different network types, which improves multicast efficiency.

Optionally, this embodiment may further include the following content:

103. The multicast address translation router sends a second multicast join request packet to the multicast data providing node along the shorter path after determining the shorter path. Multicast data requested by the second multicast join request packet may include multicast data requested by the first multicast join request packet, and may also be the same as the multicast data requested by the first multicast join request packet.

Optionally, this embodiment may further include the following content on the basis of the 101 and 102 or on the basis of 101, 102, and 103:

104. The multicast address translation router receives a first multicast data packet through a third path.

105. The multicast address translation router receives a second multicast data packet through a fourth path, where a multicast address of the second multicast data packet may be obtained by performing Internet Protocol version translation on a multicast address of the first multicast data packet. In other words, there is a mapping relationship between the multicast address of the second multicast data packet and the multicast address of the first multicast data packet, where the multicast address of the first multicast data packet may be obtained by performing the Internet Protocol version translation on the multicast address of the second multicast data packet, and the multicast address of the second multicast data packet may be obtained by performing the Internet Protocol version translation on the multicast address of the first multicast data packet.

106. The multicast address translation router determines a new shorter path and a new non-shorter path between the third path and the fourth path.

Optionally, this embodiment further includes the following content:

107. The multicast address translation router sends a prune message to the multicast data providing node along the new non-shorter path.

The third path may or may not be the first path; the fourth path may or may not be the second path; the third path and the fourth path should not be a same path.

This embodiment makes a further improvement in a process of receiving a multicast data packet, so as to select a shorter path from paths of different network types and prune a non-shorter path, thereby further improving multicast efficiency.

Embodiment 2 of the Present Invention

Figure 2:
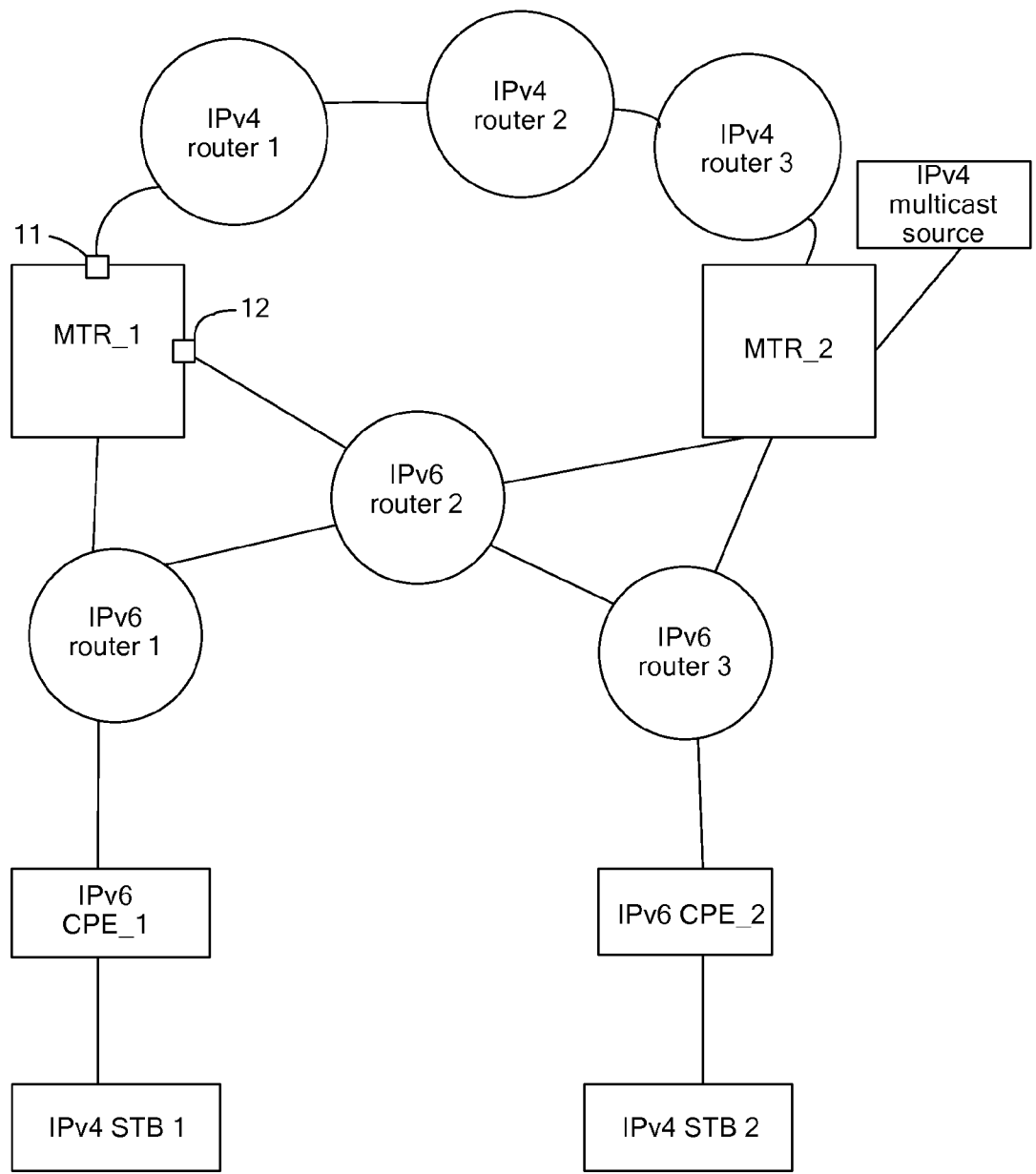
FIG. 2 is a schematic structural diagram of a network according to an embodiment of the present invention.

FIG. 2 is a schematic structural diagram of a network according to an embodiment of the present invention.

A multicast address translation router 1 (MTR_1 for short in English) and a multicast address translation router 2 (MTR_2 for short in English) both are a device supporting both IPv4 and IPv6, where the MTR_2 is an aggregation node. Two parallel links exist between the MTR_1 and the MTR_2, which respectively are: the MTR_1, an IPv4 router 1, an IPv4 router 2, an IPv4 router 3, and the MTR_2; and the MTR_1, an IPv6 router 2, and the MTR_2. The MTR_1 is connected to an IPv6 customer premises equipment 1 (IPv6 CPE_1 for short in English) by using an IPv6 router 1, where the IPv6 CPE_1 is further connected to an IPv4 set-top box 1 (IPv4 STB 1 for short in English).

Figure 3:
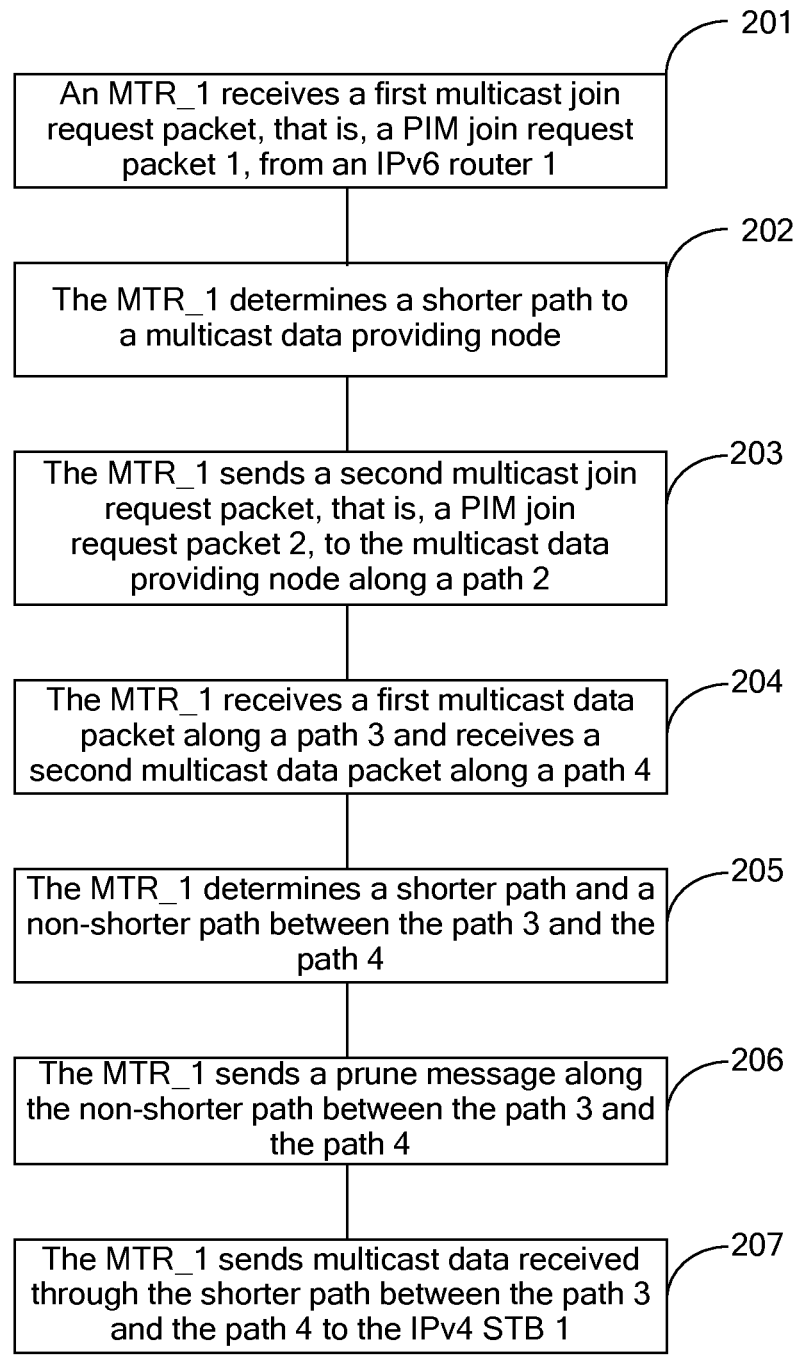
FIG. 3 is a schematic diagram of a method according to an embodiment of the present invention.

As shown in FIG. 3, Embodiment 2 of the present invention includes the following content:

201. The MTR_1 receives a first multicast join request packet from the IPv6 router 1. In this embodiment, the first multicast join request packet is a PIM join request packet 1, where the PIM join request packet 1 is an IPv6 packet, and a multicast address of the PIM join request packet 1 is an IPv6 multicast address obtained by performing Internet Protocol version translation on an IPv4 multicast address. In this embodiment, the multicast address of the PIM join request packet 1 is ffxx:abc::232.1.1.123, which is obtained by adding an IPv6 prefix to an IPv4 address 232.1.1.123; a specified source address is 64:ff9b::10.1.1.140, which is obtained by adding a prefix to an IPv4 address 10.1.1.140. The PIM join request packet 1 is obtained by the IPv6 router 1 by re-encapsulating an MLD v2 join request packet sent by the IPv6 CPE_1 to the IPv6 router 1. Optionally, after receiving the MLD v2 join request packet, the IPv6 router 1 further creates (multicast source, multicast group) (S, G) status information having a multicast address ffxx:abc::232.1.1.123 and a source address 64:ff9b::10.1.1.140, and recipient list information corresponding to the status information, and adds an interface, which is connected to the IPv6 CPE_1, on the IPv6 router 1 to the recipient list. The MLD v2 join request packet is obtained by the IPv6 CPE_1 by re-encapsulating an IGMP v3 join request packet sent by the IPv4 STB 1, where a multicast address of the IGMP v3 join request packet is 232.1.1.123, and a specified multicast source address is 10.1.1.140.

Optionally, after receiving the PIM join request packet 1, the MTR_1 creates (S, G) status information having a multicast address ffxx:abc::232.1.1.123 and a multicast source address 64:ff9b::10.1.1.140, and recipient list information corresponding to the status information, and adds an interface (that is, an interface that receives the PIM join request packet 1), which is connected to the IPv6 router 1, on the MTR_1 to the recipient list of the MTR_1.

202. The MTR_1 determines a shorter path to a multicast data providing node.

In this embodiment, the PIM join request packet 1 carries the multicast source address; therefore, the multicast data providing node is an IPv4 multicast source and is not the MTR_2 that is used as the aggregation node.

As shown in FIG. 2, paths from the MTR_1 to the IPv4 multicast source include a path 1 and a path 2 at least, where nodes that the path 1 goes through include the MTR_1, the IPv4 router 1, the IPv4 router 2, the IPv4 router 3, the MTR_2, and the IPv4 multicast source, and nodes that the path 2 goes through include the MTR_1, the IPv6 router 2, the MTR_2, and the IPv4 multicast source.

The MTR_1 receives a PIM Assert packet 1 from an IPv4 interface, which is connected to the IPv4 router 1, on the MTR_1, where the PIM Assert packet 1 carries a distance of the path 1, where a distance value is 5. The IPv4 interface, which is connected to the IPv4 router 1, on the MTR_1 is the IPv4 interface of the multicast address translation router in Embodiment 1.

The MTR_1 receives a PIM Assert packet 2 from an IPv6 interface, which is connected to the IPv6 router 2, on the MTR_1, where the PIM Assert packet 2 carries a distance of the path 2, where a distance value is 4 and the distance value 4 includes a translation distance generated when the MTR_2 translates an IPv4 multicast packet into an IPv6 multicast packet. The IPv6 interface, which is connected to the IPv6 router 2, on the MTR_1 is the IPv6 interface of the multicast address translation router in Embodiment 1. Optionally, the distance of the path 2 carried by the PIM Assert packet 2 may also not include the translation distance generated when the MTR_2 translates the IPv4 multicast packet into the IPv6 multicast packet.

Because the MTR_1 needs to translate the IPv4 multicast packet received through the path 1 into an IPv6 multicast packet, during shorter-path determining, a distance calculation value needs to be determined according to the distance of the path 1 and a translation distance generated when the MTR_1 translates the IPv4 multicast packet into the IPv6 multicast packet. For example, when a distance value of the translation distance generated when the MTR_1 translates the IPv4 multicast packet into the IPv6 multicast packet is 1, the distance calculation value may be 6. Because the distance calculation value 6 is greater than the distance value 4 of the path 2, it may be determined that the path 2 is the shorter path.

In this embodiment, after receiving the first multicast join request packet, the MTR_1 may determine the shorter path between the path 1 and the path 2, where part of the path 1 is an IPv4 path and part of the path 2 is an IPv6 path, thereby implementing a method for selecting a shorter path from the paths of different network types, which improves multicast efficiency.

Optionally, this embodiment may further include the following content:

203. The MTR_1 sends a second multicast join request packet to the multicast data providing node along the path 2. In this embodiment, the second multicast join request packet is a PIM join request packet 2, and the multicast data providing node is the IPv4 multicast source. In this embodiment, because a next-hop node on the path 2 of the MTR_2 is the IPv6 router 2, the PIM join request packet 2 is an IPv6 packet, and a multicast address and a multicast source address carried by the PIM join request packet 2 are the same as the multicast address and the multicast source address of the PIM join request packet 1.

204. The MTR_1 receives a first multicast data packet along a path 3 and receives a second multicast data packet along a path 4, where the first multicast data packet is an IPv4 packet, the second multicast data packet is an IPv6 packet, and a multicast address of the second multicast data packet may be obtained by performing Internet Protocol version translation on a multicast address of the first multicast data packet. In other words, the multicast address of the second multicast data packet may be generated according to an IPv6 prefix and the IPv4 multicast address of the first multicast data packet. The path 3 may be the same as or different from the path 1, and the path 4 may be the same as or different from the path 2.

205. The MTR_1 determines a shorter path and a non-shorter path between the path 3 and the path 4.

Optionally, this embodiment further includes the following content:

206. The MTR_1 sends a prune message along the non-shorter path of the path 3 and the path 4, so as to receive multicast data carried by the first multicast data packet or the second multicast data packet through the shorter path between the path 3 and the path 4. In this embodiment, the first multicast data packet and the second multicast data packet are from a same multicast source; therefore, the multicast data carried by the first multicast data packet and the multicast data carried by the second multicast data packet belong to the same data source.

Optionally, this embodiment further includes the following content:

207. The MTR_1 sends the multicast data received through the shorter path between the path 3 and the path 4 to the IPv4 STB 1.

This embodiment makes a further improvement in a process of receiving a multicast data packet, so as to select a shorter path from paths of different network types and prune a non-shorter path, thereby further improving multicast efficiency.

Embodiment 3 of the Present Invention

Figure 4:
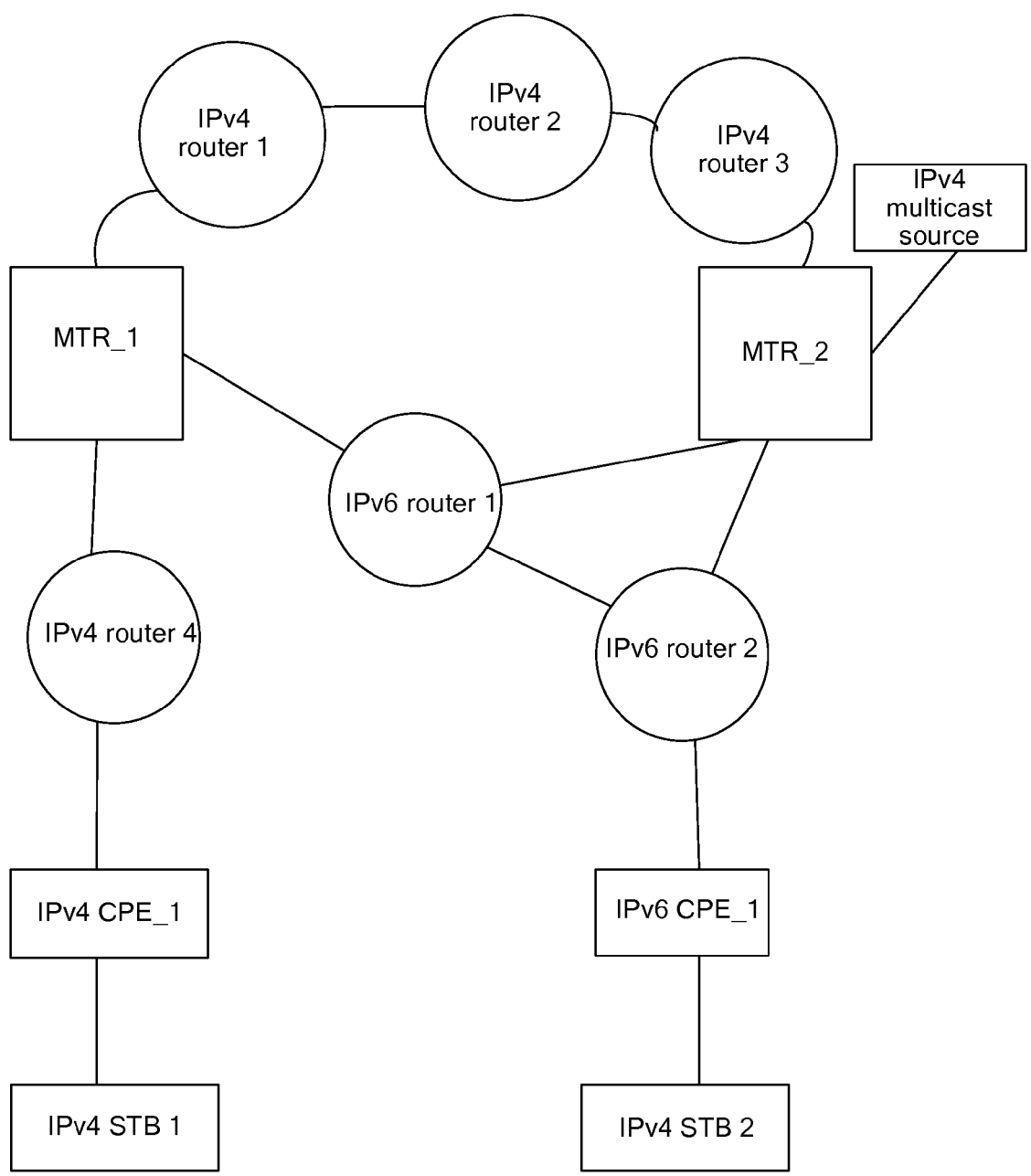
FIG. 4 is a schematic structural diagram of a network according to an embodiment of the present invention.

FIG. 4 is a schematic structural diagram of a network according to an embodiment of the present invention.

In Embodiment 3 of the present invention, a multicast address translation router 1 (MTR_1 for short in English) and a multicast address translation router 2 (MTR_2 for short in English) both are a device supporting both IPv4 and IPv6, where the MTR_2 is an aggregation node. Two parallel links exist between the MTR_1 and the MTR_2, which respectively are: the MTR_1, an IPv4 router 1, an IPv4 router 2, an IPv4 router 3, and the MTR_2; and the MTR_1, an IPv6 router 1, and the MTR_2. The MTR_1 is connected to an IPv4 customer premises equipment 1 (IPv4 CPE_1 for short in English) by using an IPv4 router 4, where the IPv4 CPE_1 is further connected to an IPv4 set-top box 1 (IPv4 STB 1 for short in English).

Figure 5:
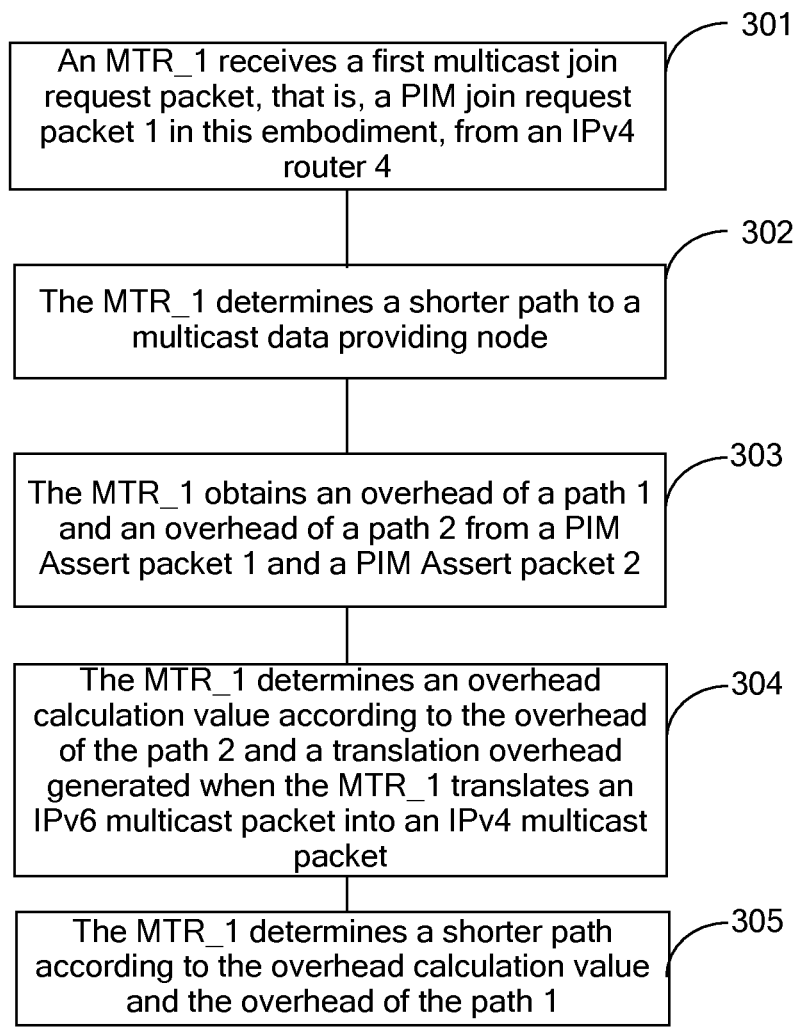
FIG. 5 is a schematic diagram of a method according to an embodiment of the present invention.

As shown in FIG. 5, Embodiment 3 of the present invention includes the following content:

301. The MTR_1 receives a first multicast join request packet from the IPv4 router 4. In this embodiment, the first multicast join request packet is a PIM join request packet 1, and a multicast address of the PIM join request packet 1 is 232.1.1.123, and a specified source address is 10.1.1.140.

Optionally, after receiving the PIM join request packet 1, the MTR_1 creates (S, G) status information having a multicast address 232.1.1.123 and a multicast source address 10.1.1.140, and recipient list information corresponding to the status information, and adds an interface (that is, an interface that receives the PIM join request packet 1), which is connected to the IPv4 router 4, on the MTR_1 to the recipient list of the MTR_1.

302. The MTR_1 determines a shorter path to a multicast data providing node.

In this embodiment, the PIM join request packet 1 carries the multicast source address; therefore, the multicast data providing node is an IPv4 multicast source and is not the MTR_2 that is used as the aggregation node.

As shown in FIG. 4, paths from the MTR_1 to the IPv4 multicast source include a path 1 and a path 2 at least, where nodes that the path 1 goes through include the MTR_1, the IPv4 router 1, the IPv4 router 2, the IPv4 router 3, the MTR_2, and the IPv4 multicast source, and nodes that the path 2 goes through include the MTR_1, the IPv6 router 1, the MTR_2, and the IPv4 multicast source.

The MTR_1 receives a PIM Assert packet 1 from an IPv4 interface, which is connected to the IPv4 router 1, on the MTR_1, where the PIM Assert packet 1 carries a distance of the path 1, and a distance value is 5. The MTR_1 receives a PIM Assert packet 2 from an IPv6 interface, which is connected to the IPv6 router 1, on the MTR_1, where the PIM Assert packet 2 carries a distance of the path 2, a distance value is 4, and the distance value 4 includes a translation distance generated when the MTR_2 translates an IPv4 multicast packet into an IPv6 multicast packet. Optionally, the distance of the path 2 carried by the PIM Assert packet 2 may also not include the translation distance generated when the MTR_2 translates the IPv4 multicast packet into the IPv6 multicast packet.

Because the MTR_1 needs to translate the IPv6 multicast packet received through the path 2 into an IPv4 multicast packet, during shorter-path determining, a distance calculation value needs to be determined according to the distance of the path 2 and a translation distance generated when the MTR_1 translates the IPv6 multicast packet into the IPv4 multicast packet. For example, when a distance value of the translation distance generated when the MTR_1 translates the IPv6 multicast packet into the IPv4 multicast packet is 1, and the distance value of the path 2 carried by the PIM Assert packet 2 is 4, the distance calculation value may be 4+1=5. In this case, either path of the path 1 and the path 2 may be selected as the shorter path, or the shorter path may be further determined according to an overhead.

In this embodiment, after receiving the first multicast join request packet, the MTR_1 may determine the shorter path between the path 1 and the path 2, where part of the path 1 is an IPv4 path and part of the path 2 is an IPv6 path, thereby implementing a method for selecting a shorter path from the paths of different network types, which improves multicast efficiency.

When the shorter path needs to be further determined according to an overhead, this embodiment may further include the following content:

303. The MTR_1 obtains an overhead of the path 1 and an overhead of the path 2 from the PIM Assert packet 1 and the PIM Assert packet 2. For example, the overhead of the path 1 is 10, and the overhead of the path 2 is 5.

304. The MTR_1 determines an overhead calculation value according to the overhead of the path 2 and a translation overhead generated when the MTR_1 translates the IPv6 multicast packet into the IPv4 multicast packet.

Because the MTR_1 needs to translate the received IPv6 multicast packet into the IPv4 multicast packet, the translation overhead is generated, where the translation overhead needs to be considered during shorter-path selection. In this embodiment, a value of the translation overhead is 1. Actually, the value of the translation overhead may also be another value determined according to actual conditions. When the overhead of the path 2 is 5 and the value of the translation overhead is 1, the overhead calculation value may be 6, that is, a sum of the overhead of the path 2 and the translation overhead. Certainly, the overhead calculation value may also be determined by using another mathematical operation relationship.

305. The MTR_1 determines a shorter path according to the overhead calculation value and the overhead of the path 1.

When the overhead of the path 1 is 10 and the overhead calculation value is 6, the MTR_1 determines the path 2 as the shorter path.

This embodiment makes a further improvement in a process of receiving a multicast data packet, so as to select a shorter path from paths of different network types and prune a non-shorter path, thereby further improving multicast efficiency.

Embodiment 4 of the Present Invention

Figure 6:
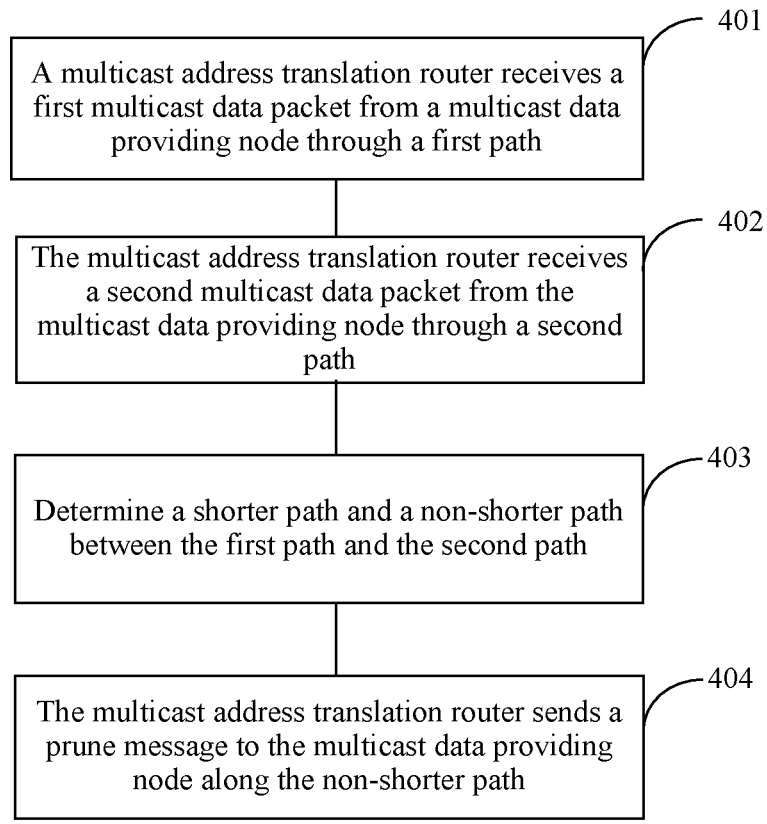
FIG. 6 is a schematic diagram of a method according to an embodiment of the present invention.

FIG. 6 is a schematic diagram of a method according to an embodiment of the present invention. As shown in FIG. 6, Embodiment 4 of the present invention includes the following content:

401. A multicast address translation router receives a first multicast data packet from a multicast data providing node through a first path, where the first path is a path between an Internet Protocol version 4 (fully spelled as Internet Protocol version 4 in English, and referred to as IPv4 for short in English) interface of the multicast address translation router and the multicast data providing node.

Optionally, the IPv4 interface of the multicast address translation router refers to a physical interface or a virtual interface connected to the multicast data providing node by using a data signal cable, and a distance between the IPv4 interface of the multicast address translation router and the multicast data providing node is not infinite. In a network shown in FIG. 2, an interface 11 is the IPv4 interface of the multicast address translation router.

402. The multicast address translation router receives a second multicast data packet from the multicast data providing node through a second path, where the second path is a path between an Internet Protocol version 6 (fully spelled as Internet Protocol version 6 in English, and referred to as IPv6 for short in English) interface of the multicast address translation router and the multicast data providing node, and a multicast address of the second multicast data packet may be obtained by performing Internet Protocol version translation on a multicast address of the first multicast data packet.

Optionally, the IPv6 interface of the multicast address translation router refers to a physical interface or a virtual interface connected to the multicast data providing node by using a data signal cable, and a distance between the IPv6 interface of the multicast address translation router and the multicast data providing node is not infinite. In the network shown in FIG. 2, an interface 12 is the IPv6 interface of the multicast address translation router.

403. Determine a shorter path and a non-shorter path between the first path and the second path.

Optionally, the shorter path is determined according to path parameters.

Optionally, the path parameters include a distance of the first path, a distance of the second path, and a translation distance generated when the multicast address translation router performs Internet Protocol (IP) translation on a multicast packet. Optionally, when a multicast join request packet that is received by the multicast address translation router and used for requesting the first multicast data packet or the second multicast data packet is an IPv6 packet and a multicast address of the multicast join request packet is an IPv6 multicast address obtained by performing Internet Protocol version translation on an IPv4 multicast address, the determining of the shorter path and the non-shorter path between the first path and the second path includes: determining a distance calculation value of the first path according to the distance of the first path and the translation distance, for example, adding the distance of the first path to the translation distance to obtain the distance calculation value of the first path; and determining the shorter path and the non-shorter path between the first path and the second path according to the distance calculation value of the first path and the distance of the second path, for example, comparing the distance calculation value of the first path and the distance of the second path, and selecting a path having a smaller distance as the shorter path. Optionally, when the multicast join request packet that is received by the multicast address translation router and for requesting the first multicast data packet or the second multicast data packet is an IPv4 packet, the determining of the shorter path and the non-shorter path between the first path and the second path includes: determining a distance calculation value of the second path according to the distance of the second path and the translation distance; and determining the shorter path and the non-shorter path between the first path and the second path according to the distance calculation value of the second path and the distance of the first path.

Optionally, the path parameters include an overhead of the first path, an overhead of the second path, and a translation overhead generated when the multicast address translation router performs Internet Protocol (IP) translation on a multicast packet. Optionally, when a multicast join request packet that is received by the multicast address translation router and for requesting the first multicast data packet or the second multicast data packet is an IPv6 packet and a multicast address of the multicast join request packet is an IPv6 multicast address obtained by performing Internet Protocol version translation on an IPv4 multicast address, the determining of the shorter path and the non-shorter path between the first path and the second path includes: determining an overhead calculation value of the first path according to the overhead of the first path and the translation overhead, for example, adding the overhead of the first path to the translation overhead to obtain the overhead calculation value of the first path; and determining the shorter path and the non-shorter path between the first path and the second path according to the overhead calculation value of the first path and the overhead of the second path, for example, comparing the overhead calculation value of the first path and the overhead of the second path, and selecting a path having a smaller overhead as the shorter path. Optionally, when the multicast join request packet that is received by the multicast address translation router and for requesting the first multicast data packet or the second multicast data packet is an IPv4 packet, the determining of the shorter path and the non-shorter path between the first path and the second path includes: determining an overhead calculation value of the second path according to the overhead of the second path and the translation overhead; and determining the shorter path and the non-shorter path between the first path and the second path according to the overhead calculation value of the second path and the overhead of the first path.

Optionally, the path parameters include a distance of the first path, a distance of the second path, a translation distance generated when the multicast address translation router performs Internet Protocol (IP) translation on a multicast packet, an overhead of the first path, an overhead of the second path, and a translation overhead generated when the multicast address translation router performs the Internet Protocol (IP) translation on the multicast packet. Optionally, when a multicast join request packet that is received by the multicast address translation router and for requesting the first multicast data packet or the second multicast data packet is an IPv6 packet and a multicast address of the multicast join request packet is an IPv6 multicast address obtained by performing Internet Protocol version translation on an IPv4 multicast address, the determining of the shorter path and the non-shorter path between the first path and the second path includes: determining a distance calculation value of the first path according to the distance of the first path and the translation distance; determining an overhead calculation value of the first path according to the overhead of the first path and the translation overhead; determining a first comprehensive calculation value according to the distance calculation value of the first path and the overhead calculation value of the first path; determining a second comprehensive calculation value according to the distance of the second path and the overhead of the second path; and determining the shorter path and the non-shorter path between the first path and the second path according to the first comprehensive calculation value and the second comprehensive calculation value. Optionally, when the multicast join request packet that is received by the multicast address translation router and for requesting the first multicast data packet or the second multicast data packet is an IPv4 packet, the determining of the shorter path and the non-shorter path between the first path and the second path includes: determining a first comprehensive calculation value according to the distance of the first path and the overhead of the first path; determining a distance calculation value of the second path according to the distance of the second path and the translation distance; determining an overhead calculation value of the second path according to the overhead of the second path and the translation overhead; determining a second comprehensive calculation value according to the distance calculation value of the second path and the overhead calculation value of the second path; and determining the shorter path between the first path and the second path according to the first comprehensive calculation value and the second comprehensive calculation value.

Optionally, the distance of the first path and/or the overhead of the first path are (is) carried by a Protocol Independent Multicast Assert (fully spelled as PIM Assert in English) packet received by the IPv4 interface. Optionally, the PIM Assert packet is generated by the multicast data providing node, and is forwarded to the IPv4 interface along the first path in a hop by hop manner. Each time the PIM Assert packet is forwarded, the distance of the first path and/or the overhead of the first path carried in the PIM Assert packet are (is) correspondingly increased one time. In this way, when the PIM Assert packet is received by the IPv4 interface, the distance of the first path and/or the overhead of the first path may be determined When the first path is a mixed path that includes an IPv4 path segment and an IPv6 path segment, the distance of the first path may further include a translation distance between the IPv4 path segment and the IPv6 path segment, or may not include the translation distance between the IPv4 path segment and the IPv6 path segment; the overhead of the first path may further include a translation overhead between the IPv4 path segment and the IPv6 path segment, or may not include the translation overhead between the IPv4 path segment and the IPv6 path segment.

Optionally, the distance of the second path and/or the overhead of the second path are (is) carried by a Protocol Independent Multicast Assert (fully spelled as PIM Assert in English) packet received by the IPv6 interface. Optionally, the PIM Assert packet is generated by the multicast data providing node, and is forwarded to the IPv6 interface along the second path in a hop by hop manner. Each time the PIM Assert packet is forwarded, the distance of the second path and/or the overhead of the second path carried in the PIM Assert packet are (is) correspondingly increased one time. In this way, when the PIM Assert packet is received by the IPv6 interface, the distance of the second path and/or the overhead of the second path may be determined When the second path is a mixed path that includes an IPv4 path segment and an IPv6 path segment, the distance of the second path may further include a translation distance between the IPv4 path segment and the IPv6 path segment, or may not include the translation distance between the IPv4 path segment and the IPv6 path segment; the overhead of the second path may further include a translation overhead between the IPv4 path segment and the IPv6 path segment, or may not include the translation overhead between the IPv4 path segment and the IPv6 path segment.

Optionally, the translation distance is determined by the multicast address translation router, or the translation distance is preconfigured in the multicast address translation router.

Optionally, the multicast data providing node is a multicast source node or an aggregation node. Optionally, when the first multicast join request packet carries a multicast address but does not carry a multicast source address, the multicast data providing node is the multicast source node. Optionally, when the first multicast join request packet carries a multicast address and multicast source address, the multicast data providing node is the aggregation node.

404. The multicast address translation router sends a prune message to the multicast data providing node along the non-shorter path.

In this embodiment, the multicast address translation router may determine a shorter path between a first path and a second path to receive a multicast data packet after receiving a first multicast data packet and a second multicast data packet, where all or part of the first path and the second path separately belong to different network types, thereby implementing a method for selecting a shorter path from the paths of different network types, which improves multicast efficiency.

Embodiment 5 of the Present Invention

Figure 7A:
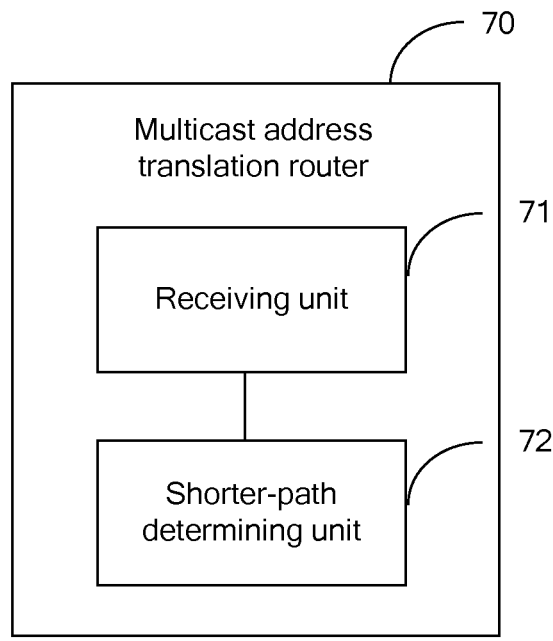
FIG. 7A is a schematic diagram of an apparatus according to an embodiment of the present invention.

As shown in FIG. 7A, a multicast address translation router 70 includes:

a receiving unit 71, configured to receive a first multicast join request packet, where the first multicast join request packet is an Internet Protocol version 4 IPv4 packet and a multicast address of the first multicast join request packet is an IPv4 multicast address, or the first multicast join request packet is an Internet Protocol version 6 IPv6 packet and a multicast address of the first multicast join request packet is an IPv6 multicast address obtained by performing Internet Protocol version translation on an IPv4 multicast address; and a shorter-path determining unit 72, configured to determine a shorter path between a first path and a second path, where the first path is a path between an IPv4 interface of the multicast address translation router and a multicast data providing node corresponding to the first multicast join request packet, and the second path is a path between an IPv6 interface of the multicast address translation router and the multicast data providing node corresponding to the first multicast join request packet.

Optionally, the shorter-path determining unit 72 determines the shorter path according to path parameters, where the path parameters include:

a distance of the first path, a distance of the second path, and a translation distance generated when the multicast address translation router performs Internet Protocol IP translation on a multicast packet; or an overhead of the first path, an overhead of the second path, and a translation overhead generated when the multicast address translation router performs Internet Protocol IP translation on a multicast packet; or a distance of the first path, a distance of the second path, a translation distance generated when the multicast address translation router performs Internet Protocol IP translation on a multicast packet, an overhead of the first path, an overhead of the second path, and a translation overhead generated when the multicast address translation router performs the Internet Protocol IP translation on the multicast packet.

Optionally, when the first multicast join request packet is the IPv6 packet and the multicast address of the first multicast join request packet is the IPv6 multicast address obtained by performing the Internet Protocol version translation on the IPv4 multicast address, the shorter-path determining unit 72 is specifically configured to:

determine a distance calculation value of the first path according to the distance of the first path and the translation distance; and determine the shorter path between the first path and the second path according to the distance calculation value of the first path and the distance of the second path;

or determine an overhead calculation value of the first path according to the overhead of the first path and the translation overhead; and determine the shorter path between the first path and the second path according to the overhead calculation value of the first path and the overhead of the second path;

or determine a distance calculation value of the first path according to the distance of the first path and the translation distance; determine an overhead calculation value of the first path according to the overhead of the first path and the translation overhead; determine a first comprehensive calculation value according to the distance calculation value of the first path and the overhead calculation value of the first path; determine a second comprehensive calculation value according to the distance of the second path and the overhead of the second path; and determine the shorter path between the first path and the second path according to the first comprehensive calculation value and the second comprehensive calculation value.

Optionally, when the first multicast join request packet is the IPv4 packet and the multicast address of the first multicast join request packet is the IPv4 multicast address, the shorter-path determining unit 72 is specifically configured to:

determine a distance calculation value of the second path according to the distance of the second path and the translation distance; and determine the shorter path between the first path and the second path according to the distance calculation value of the second path and the distance of the first path;

or determine an overhead calculation value of the second path according to the overhead of the second path and the translation overhead; and determine the shorter path between the first path and the second path according to the overhead calculation value of the second path and the overhead of the first path;

or determine a first comprehensive calculation value according to the distance of the first path and the overhead of the first path; determine a distance calculation value of the second path according to the distance of the second path and the translation distance; determine an overhead calculation value of the second path according to the overhead of the second path and the translation overhead; determine a second comprehensive calculation value according to the distance calculation value of the second path and the overhead calculation value of the second path; and determine the shorter path between the first path and the second path according to the first comprehensive calculation value and the second comprehensive calculation value.

Figure 7B:
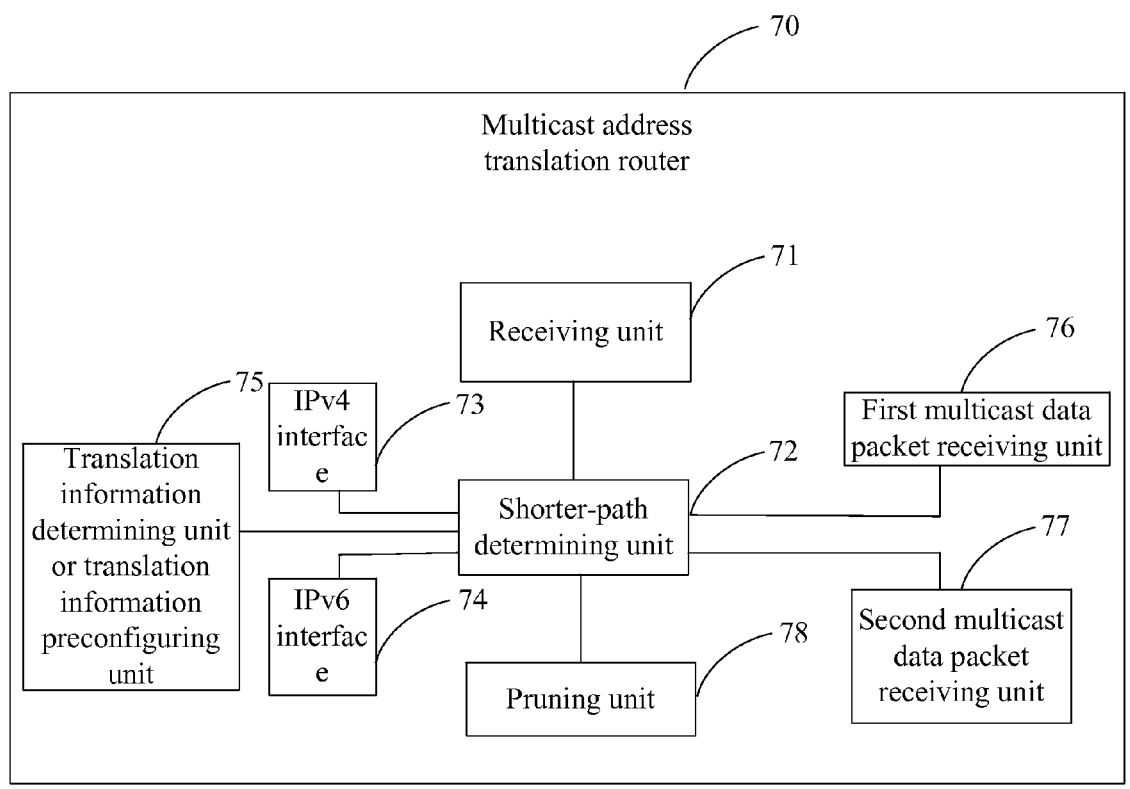
FIG. 7B is a schematic diagram of an apparatus according to an embodiment of the present invention.

As shown is FIG. 7B, in addition to including the receiving unit 71 and the shorter-path determining unit 72, the multicast address translation router 70 further includes:

an IPv4 interface 73, configured to receive a Protocol Independent Multicast Assert PIM Assert packet that carries the distance of the first path and/or the overhead of the first path; and an IPv6 interface 74, configured to receive a Protocol Independent Multicast Assert PIM Assert packet that carries the distance of the second path and/or the overhead of the second path.

Optionally, the multicast address translation router 70 further includes:

a translation information determining unit 75, configured to determine the translation distance and/or translation overhead;

or a translation information preconfiguring unit 75, configured to preconfigure the translation distance and/or translation overhead in the multicast address translation router.

In this embodiment, the multicast data providing node 70 may be a multicast source node or an aggregation node.

In this embodiment, the multicast address translation router 70 may determine a shorter path between a first path and a second path after receiving an IPv4 or IPv6 multicast join request packet, where all or part of the first path and the second path separately belong to different network types, thereby implementing a method for selecting a shorter path from the paths of different network types, which improves multicast efficiency.

Optionally, the multicast address translation router 70 further includes:

a first multicast data packet receiving unit 76, configured to receive a first multicast data packet through a third path; and a second multicast data packet receiving unit 77, configured to receive a second multicast data packet through a fourth path, where a multicast address of the second multicast data packet may be obtained by performing Internet Protocol version translation on a multicast address of the first multicast data packet.

Optionally, the shorter-path determining unit 72 is further configured to determine a new shorter path and a new non-shorter path between the third path and the fourth path.

Optionally, the multicast address translation router 70 further includes:

a pruning unit 78, configured to send a prune message to the multicast data providing node along the new non-shorter path.

The units or interfaces included in the multicast address translation router 70 may be physical entities or may be virtual. The multicast address translation router 70 may be an independent network device or be integrated into another network device.

This embodiment makes a further improvement in a process of receiving a multicast data packet, so as to select a shorter path from paths of different network types and prune a non-shorter path, thereby further improving multicast efficiency.

Embodiment 6 of the Present Invention

Figure 8A:
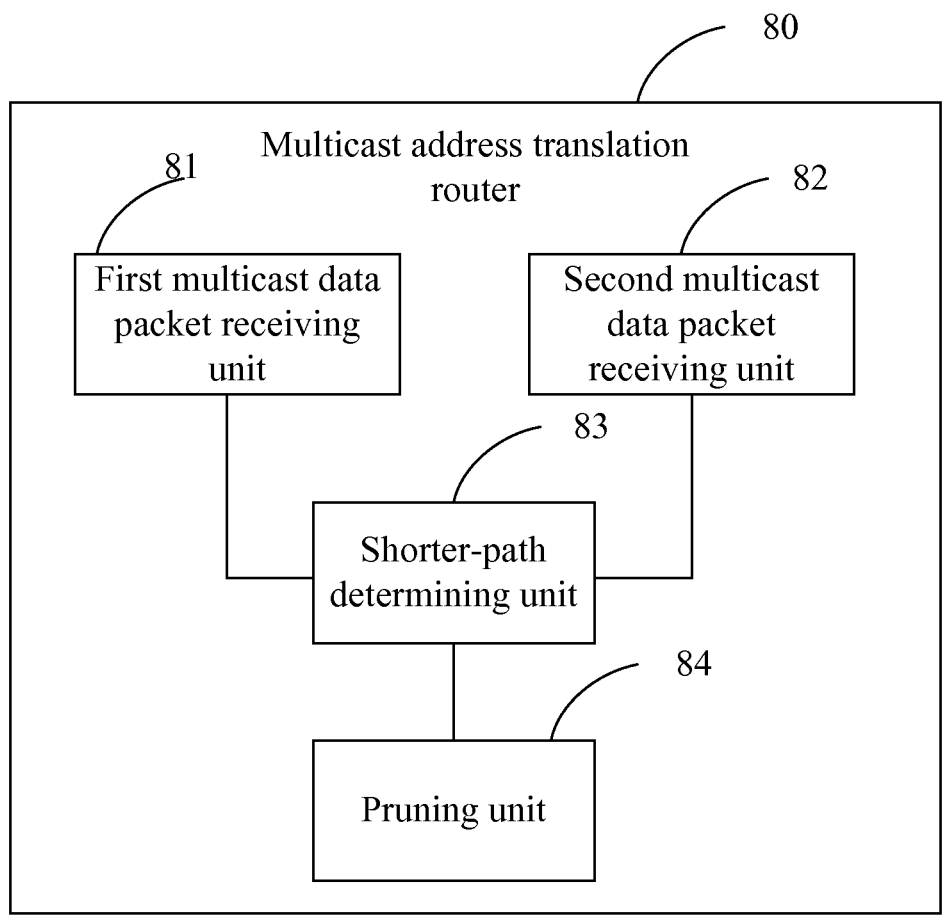
FIG. 8A is a schematic diagram of an apparatus according to an embodiment of the present invention.

As shown in FIG. 8A, a multicast address translation router 80 includes:

a first multicast data packet receiving unit 81, configured to receive a first multicast data packet from a multicast data providing node through a first path, where the first path is a path between an Internet Protocol version 4 IPv4 interface of the multicast address translation router and the multicast data providing node;

a second multicast data packet receiving unit 82, configured to receive a second multicast data packet from the multicast data providing node through a second path, where the second path is a path between an Internet Protocol version 6 IPv6 interface of the multicast address translation router and the multicast data providing node, and a multicast address of the second multicast data packet may be obtained by performing Internet Protocol version translation on a multicast address of the first multicast data packet;

a shorter-path determining unit 83, configured to determine a shorter path and a non-shorter path between the first path and the second path; and a pruning unit 84, configured to send a prune message to the multicast data providing node along the non-shorter path.

Preferably, the shorter-path determining unit 83 determines the shorter path according to path parameters, where the path parameters include:

a distance of the first path, a distance of the second path, and a translation distance generated when the multicast address translation router performs Internet Protocol IP translation on a multicast packet; or an overhead of the first path, an overhead of the second path, and a translation overhead generated when the multicast address translation router performs Internet Protocol IP translation on a multicast packet; or a distance of the first path, a distance of the second path, a translation distance generated when the multicast address translation router performs Internet Protocol IP translation on a multicast packet, an overhead of the first path, an overhead of the second path, and a translation overhead generated when the multicast address translation router performs the Internet Protocol IP translation on the multicast packet.

Figure 8B:
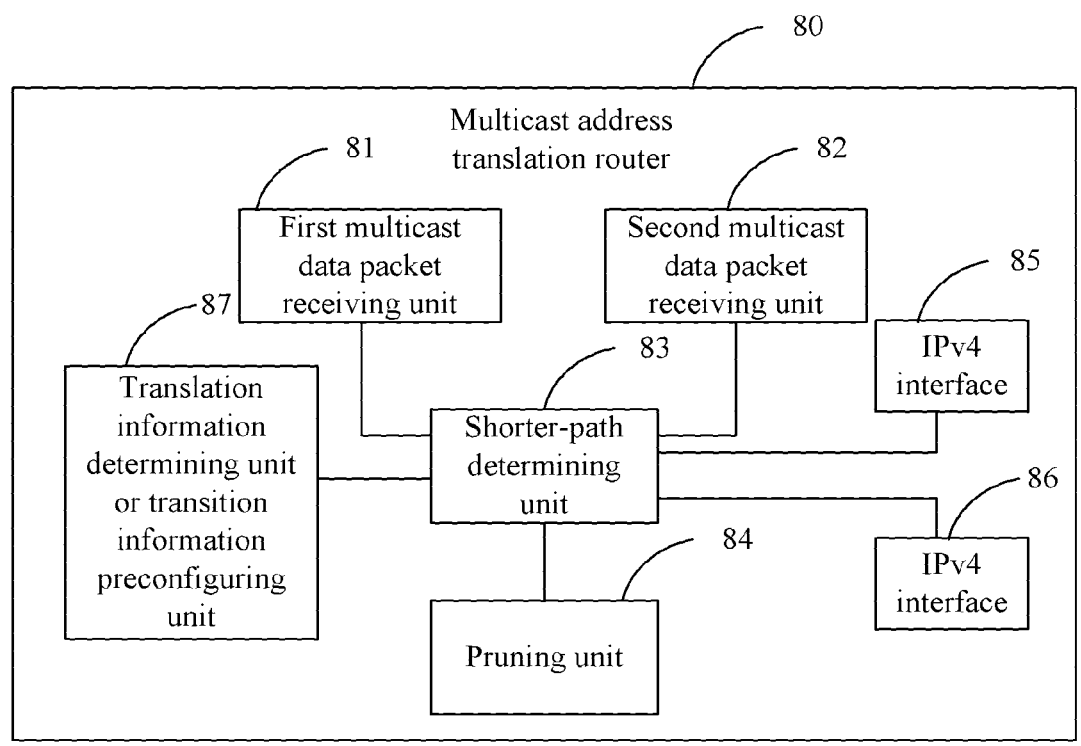
FIG. 8B is a schematic diagram of an apparatus according to an embodiment of the present invention.

Optionally, as shown in FIG. 8B, in addition to including the first multicast data packet receiving unit 81, the second multicast data packet receiving unit 82, the shorter-path determining unit 83, and the pruning unit 84, the multicast address translation router 80 further includes:

an IPv4 interface 85, configured to receive a Protocol Independent Multicast Assert PIM Assert packet that carries the distance of the first path and/or the overhead of the first path; and an IPv6 interface 86, configured to receive a Protocol Independent Multicast Assert PIM Assert packet that carries the distance of the second path and/or the overhead of the second path.

Optionally, the multicast address translation router 80 further includes:

a translation information determining unit 87, configured to determine the translation distance and/or translation overhead;

or a translation information preconfiguring unit 87, configured to preconfigure the translation distance and/or translation overhead in the multicast address translation router.

Optionally, when a multicast join request packet that is received by the multicast address translation router 80 and used for requesting the first multicast data packet or the second multicast data packet is an IPv6 packet and a multicast address of the multicast join request packet is an IPv6 multicast address obtained by performing Internet Protocol version translation on an IPv4 multicast address, the shorter-path determining unit 83 is specifically configured to:

determine a distance calculation value of the first path according to the distance of the first path and the translation distance; and determine the shorter path and the non-shorter path between the first path and the second path according to the distance calculation value of the first path and the distance of the second path;

or determine an overhead calculation value of the first path according to the overhead of the first path and the translation overhead; and determine the shorter path and the non-shorter path between the first path and the second path according to the overhead calculation value of the first path and the overhead of the second path;

or determine a distance calculation value of the first path according to the distance of the first path and the translation distance; determine an overhead calculation value of the first path according to the overhead of the first path and the translation overhead; determine a first comprehensive calculation value according to the distance calculation value of the first path and the overhead calculation value of the first path; determine a second comprehensive calculation value according to the distance of the second path and the overhead of the second path; and determine the shorter path and the non-shorter path between the first path and the second path according to the first comprehensive calculation value and the second comprehensive calculation value.

Optionally, when a multicast join request packet that is received by the multicast address translation router 80 and for requesting the first multicast data packet or the second multicast data packet is an IPv4 packet, the shorter-path determining unit 83 is specifically configured to:

determine a distance calculation value of the second path according to the distance of the second path and the translation distance; and determine the shorter path and the non-shorter path between the first path and the second path according to the distance calculation value of the second path and the distance of the first path;

or determine an overhead calculation value of the second path according to the overhead of the second path and the translation overhead; and determine the shorter path and the non-shorter path between the first path and the second path according to the overhead calculation value of the second path and the overhead of the first path;

or determine a first comprehensive calculation value according to the distance of the first path and the overhead of the first path; determine a distance calculation value of the second path according to the distance of the second path and the translation distance; determine an overhead calculation value of the second path according to the overhead of the second path and the translation overhead; determine a second comprehensive calculation value according to the distance calculation value of the second path and the overhead calculation value of the second path; and determine the shorter path between the first path and the second path according to the first comprehensive calculation value and the second comprehensive calculation value.

The units or interfaces included in the multicast address translation router 80 may be physical entities or may be virtual. The multicast address translation router 80 may be an independent network device or be integrated into another network device.

In this embodiment, the multicast address translation router may determine a shorter path between a first path and a second path to receive a multicast data packet after receiving a first multicast data packet and a second multicast data packet, where all or part of the first path and the second path separately belong to different network types, thereby implementing a method for selecting a shorter path from the paths of different network types, which improves multicast efficiency.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely exemplary specific embodiments of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A method for determining a multicast path, comprising:
   receiving, by a multicast address translation router, a first multicast join request packet, wherein the first multicast join request packet is an Internet Protocol (IP) version 4 (IPv4) packet and a multicast address of the first multicast join request packet is an IPv4 multicast address, or the first multicast join request packet is an IP version 6 (IPv6) packet and a multicast address of the first multicast join request packet is an IPv6 multicast address obtained by performing IP version translation on an IPv4 multicast address; and
   determining, by the multicast address translation router, a shorter path between a first path and a second path, wherein the first path is a path between an IPv4 interface of the multicast address translation router and a multicast data providing node corresponding to the first multicast join request packet, and the second path is a path between an IPV6 interface of the multicast address translation router and the multicast data providing node corresponding to the first multicast join request packet.

2. The method according to claim 1, wherein the shorter path is determined according to path parameters, the path parameters comprising:
   a distance of the first path, a distance of the second path, and a translation distance generated when the multicast address translation router performs IP translation on a multicast packet; or
   an overhead of the first path, an overhead of the second path, and a translation overhead generated when the multicast address translation router performs IP translation on a multicast packet; or
   a distance of the first path, a distance of the second path, a translation distance generated when the multicast address translation router performs IP translation on a multicast packet, an overhead of the first path, an overhead of the second path, and a translation overhead generated when the multicast address translation router performs the IP translation on the multicast packet.

3. The method according to claim 2, wherein when the first multicast join request packet is the IPv6 packet and the multicast address of the first multicast join request packet is the IPv6 multicast address obtained by performing the IP version translation on the IPv 4 multicast address, the determining the shorter path between a first path and a second path comprises:
   (1) determining a distance calculation value of the first path according to the distance of the first path and the translation distance; and
   determining the shorter path between the first path and the second path according to the distance calculation value of the first path and the distance of the second path;
   or
   (2) determining an overhead calculation value of the first path according to the overhead of the first path and the translation overhead; and
   determining the shorter path between the first path and the second path according to the overhead calculation value of the first path and the overhead of the second path;
   or
   (3) determining a distance calculation value of the first path according to the distance of the first path and the translation distance;
   determining an overhead calculation value of the first path according to the overhead of the first path and the translation overhead;
   determining a first comprehensive calculation value according to the distance calculation value of the first path and the overhead calculation value of the first path;
   determining a second comprehensive calculation value according to the distance of the second path and the overhead of the second path; and
   determining the shorter path between the first path and the second path according to the first comprehensive calculation value and the second comprehensive calculation value.

4. The method according to claim 2, wherein when the first multicast join request packet is the IPv4 packet and the multicast address of the first multicast join request packet is the IPv4 multicast address, the determining the shorter path between a first path and a second path comprises:
   (1) determining a distance calculation value of the second path according to the distance of the second path and the translation distance; and
   determining the shorter path between the first path and the second path according to the distance calculation value of the second path and the distance of the first path;
   or
   (2) determining an overhead calculation value of the second path according to the overhead of the second path and the translation overhead; and
   determining the shorter path between the first path and the second path according to the overhead calculation value of the second path and the overhead of the first path;
   or
   (3) determining a first comprehensive calculation value according to the distance of the first path and the overhead of the first path;
   determining a distance calculation value of the second path according to the distance of the second path and the translation distance;

determining an overhead calculation value of the second path according to the overhead of the second path and the translation overhead;
determining a second comprehensive calculation value according to the distance calculation value of the second path and the overhead calculation value of the second path; and
determining the shorter path between the first path and the second path according to the first comprehensive calculation value and the second comprehensive calculation value.

5. The method according to claim 2, wherein:
the distance of the first path and/or the overhead of the first path are (is) carried by a Protocol Independent Multicast Assert (PIM Assert) packet received by the IPv 4interface;
the distance of the second path and/or the overhead of the second path are (is) carried by a Protocol Independent Multicast Assert (PIM Assert) packet received by the IPv6 interface;
the translation distance and/or translation overhead are (is) determined by the multicast address translation router, or the translation distance and/or translation overhead are (is) preconfigured in the multicast address translation router.

6. The method according to claim 1, further comprising:
receiving, by the multicast address translation router, a first multicast data packet through a third path;
receiving, by the multicast address translation router, a second multicast data packet through a fourth path, wherein a multicast address of the second multicast data packet may be obtained by performing Internet Protocol version translation on a multicast address of the first multicast data packet;
determining, by the multicast address translation router, a new shorter path and a new non-shorter path between the third path and the fourth path; and
sending, by the multicast address translation router, a prune message to the multicast data providing node along the new non-shorter path.

7. The method according to claim 1, wherein the multicast data providing node is a multicast source node or an aggregation node.

8. A method for receiving a multicast data packet, comprising:
receiving, by a multicast address translation router, a first multicast data packet from a multicast data providing node through a first path, wherein the first path is a path between an Internet Protocol (IP) version 4 (IPv4) interface of the multicast address translation router and the multicast data providing node;
receiving, by the multicast address translation router, a second multicast data packet from the multicast data providing node through a second path, wherein the second path is a path between an IP version 6 (IPv6) interface of the multicast address translation router and the multicast data providing node, and a multicast address of the second multicast data packet may be obtained by performing IP version translation on a multicast address of the first multicast data packet;
determining a shorter path and a non-shorter path between the first path and the second path; and
sending, by the multicast address translation router, a prune message to the multicast data providing node along the non-shorter path.

9. The method according to claim 8, wherein the shorter path is determined according to path parameters, the path parameters comprising:
a distance of the first path, a distance of the second path, and a translation distance generated when the multicast address translation router performs IP translation on a multicast packet; or
an overhead of the first path, an overhead of the second path, and a translation overhead generated when the multicast address translation router performs IP translation on a multicast packet; or
a distance of the first path, a distance of the second path, a translation distance generated when the multicast address translation router performs IP translation on a multicast packet, an overhead of the first path, an overhead of the second path, and a translation overhead generated when the multicast address translation router performs the IP translation on the multicast packet.

10. The method according to claim 9, wherein:
the distance of the first path and/or the overhead of the first path are (is) carried by a Protocol Independent Multicast Assert (PIM Assert) packet received by the IPv4 interface;
the distance of the second path and/or the overhead of the second path are (is) carried by a Protocol Independent Multicast Assert (PIM Assert) packet received by the IPv6 interface;
the translation distance is determined by the multicast address translation router, or the translation distance is preconfigured in the multicast address translation router.

11. The method according to claim 9, wherein when a multicast join request packet that is received by the multicast address translation router and used for requesting the first multicast data packet or the second multicast data packet is an IPv6 packet and a multicast address of the multicast join request packet is an IPv6 multicast address obtained by performing IP version translation on an IPv4 multicast address, the determining a shorter path and a non-shorter path between the first path and the second path comprises:
(1) determining a distance calculation value of the first path according to the distance of the first path and the translation distance; and
determining the shorter path and the non-shorter path between the first path and the second path according to the distance calculation value of the first path and the distance of the second path;
or
(2) determining an overhead calculation value of the first path according to the overhead of the first path and the translation overhead; and
determining the shorter path and the non-shorter path between the first path and the second path according to the overhead calculation value of the first path and the overhead of the second path;
or
(3) determining a distance calculation value of the first path according to the distance of the first path and the translation distance;
determining an overhead calculation value of the first path according to the overhead of the first path and the translation overhead;
determining a first comprehensive calculation value according to the distance calculation value of the first path and the overhead calculation value of the first path;

determining a second comprehensive calculation value according to the distance of the second path and the overhead of the second path; and determining the shorter path and the non-shorter path between the first path and the second path according to the first comprehensive calculation value and the second comprehensive calculation value.

12. The method according to claim 9, wherein when the multicast join request packet that is received by the multicast address translation router and for requesting the first multicast data packet or the second multicast data packet is an IPv4 packet, the determining a shorter path and a non-shorter path between the first path and the second path comprises:

(1) determining a distance calculation value of the second path according to the distance of the second path and the translation distance; and determining the shorter path and the non-shorter path between the first path and the second path according to the distance calculation value of the second path and the distance of the first path;

or (2) determining an overhead calculation value of the second path according to the overhead of the second path and the translation overhead; and determining the shorter path and the non-shorter path between the first path and the second path according to the overhead calculation value of the second path and the overhead of the first path;

or (3) determining a first comprehensive calculation value according to the distance of the first path and the overhead of the first path;

determining a distance calculation value of the second path according to the distance of the second path and the translation distance;

determining an overhead calculation value of the second path according to the overhead of the second path and the translation overhead;

determining a second comprehensive calculation value according to the distance calculation value of the second path and the overhead calculation value of the second path; and determining the shorter path between the first path and the second path according to the first comprehensive calculation value and the second comprehensive calculation value.

13. A multicast address translation router, comprising:

at least one hardware processor;

a memory interfaced to the at least one hardware processor, the memory including processor executable instructions which cause the at least one hardware processor to:

receive a first multicast join request packet, wherein the first multicast join request packet is an Internet Protocol (IP) version 4 (IPv4) packet and a multicast address of the first multicast join request packet is an IPv4 multicast address, or the first multicast join request packet is an IP version 6 (IPv6) packet and a multicast address of the first multicast join request packet is an IPv6 multicast address obtained by performing IP version translation on an IPv4 multicast address; and determine a shorter path between a first path and a second path, wherein the first path is a path between an IPv4 interface of the multicast address translation router and a multicast data providing node corresponding to the first multicast join request packet, and the second path is a path between an IPv6 interface of the multicast address translation router and the multicast data providing node corresponding to the first multicast join request packet.

14. The multicast address translation router according to claim 13, wherein the at least one hardware processor determines the shorter path according to path parameters, wherein path parameters comprise:

a distance of the first path, a distance of the second path, and a translation distance generated when the multicast address translation router performs IP translation on a multicast packet; or an overhead of the first path, an overhead of the second path, and a translation overhead generated when the multicast address translation router performs IP translation on a multicast packet; or a distance of the first path, a distance of the second path, a translation distance generated when the multicast address translation router performs IP translation on a multicast packet, an overhead of the first path, an overhead of the second path, and a translation overhead generated when the multicast address translation router performs the IP translation on the multicast packet.

15. The multicast address translation router according to claim 14, wherein when the first multicast join request packet is the IPv6packet and the multicast address of the first multicast join request packet is the IPv 6multicast address obtained by performing the IP version translation on the IPv4 multicast address, the processor executable instructions further cause the at least one hardware processor to:

(1) determine a distance calculation value of the first path according to the distance of the first path and the translation distance; and determine the shorter path between the first path and the second path according to the distance calculation value of the first path and the distance of the second path;

or (2) determine an overhead calculation value of the first path according to the overhead of the first path and the translation overhead; and determine the shorter path between the first path and the second path according to the overhead calculation value of the first path and the overhead of the second path;

or (3) determine a distance calculation value of the first path according to the distance of the first path and the translation distance;

determine an overhead calculation value of the first path according to the overhead of the first path and the translation overhead;

determine a first comprehensive calculation value according to the distance calculation value of the first path and the overhead calculation value of the first path;

determine a second comprehensive calculation value according to the distance of the second path and the overhead of the second path; and determine the shorter path between the first path and the second path according to the first comprehensive calculation value and the second comprehensive calculation value.

16. The multicast address translation router according to claim 14, wherein when the first multicast join request packet is the IPv4 packet and the multicast address of the first multicast join request packet is the IPv4 multicast address, the processor executable instructions further cause the at least one hardware processor to:
(1) determine a distance calculation value of the second path according to the distance of the second path and the translation distance; and
determine the shorter path between the first path and the second path according to the distance calculation value of the second path and the distance of the first path;
or
(2) determine an overhead calculation value of the second path according to the overhead of the second path and the translation overhead; and
determine the shorter path between the first path and the second path according to the overhead calculation value of the second path and the overhead of the first path;
or
(3) determine a first comprehensive calculation value according to the distance of the first path and the overhead of the first path;
determine a distance calculation value of the second path according to the distance of the second path and the translation distance;
determine an overhead calculation value of the second path according to the overhead of the second path and the translation overhead;
determine a second comprehensive calculation value according to the distance calculation value of the second path and the overhead calculation value of the second path; and
determine the shorter path between the first path and the second path according to the first comprehensive calculation value and the second comprehensive calculation value.

17. The multicast address translation router according to claim 14, wherein:
the multicast address translation router further comprises:
the IPv4 interface, which is configured to receive a Protocol Independent Multicast Assert (PIM Assert) packet that carries the distance of the first path and/or the overhead of the first path; and
the IPv6 interface, which is configured to receive a Protocol Independent Multicast Assert (PIM Assert) packet that carries the distance of the second path and/or the overhead of the second path; and
the processor executable instructions further cause the at least one hardware processor to:
determine the translation distance and/or translation overhead;
or
preconfigure the translation distance and/or translation overhead in the multicast address translation router.

18. The multicast address translation router according to claim 13, wherein the the processor executable instructions further cause the at least one hardware processor to:
receive a first multicast data packet through a third path; and
receive a second multicast data packet through a fourth path, wherein a multicast address of the second multicast data packet may be obtained by performing IP version translation on a multicast address of the first multicast data packet;
determine a new shorter path and a new non-shorter path between the third path and the fourth path; and
send a prune message to the multicast data providing node along the new non-shorter path.

19. The multicast address translation router according to claim 13, wherein the multicast data providing node is a multicast source node or an aggregation node.

20. A multicast address translation router, comprising:
at least one hardware processor;
a memory interfaced to the at least one hardware processor, the memory including processor executable instructions which cause the at least one hardware processor to:
receive a first multicast data packet from a multicast data providing node through a first path, wherein the first path is a path between an Internet Protocol (IP) version 4 (IPv4) interface of the multicast address translation router and the multicast data providing node;
receive a second multicast data packet from the multicast data providing node through a second path, wherein the second path is a path between an IP version 6 (IPv6) interface of the multicast address translation router and the multicast data providing node, and a multicast address of the second multicast data packet may be obtained by performing IP version translation on a multicast address of the first multicast data packet;
determine a shorter path and a non-shorter path between the first path and the second path; and
send a prune message to the multicast data providing node along the non-shorter path.

21. The multicast address translation router according to claim 20, wherein the at least one hardware processor determines the shorter path according to path parameters, wherein the path parameters comprises:
a distance of the first path, a distance of the second path, and a translation distance generated when the multicast address translation router performs IP translation on a multicast packet; or
an overhead of the first path, an overhead of the second path, and a translation overhead generated when the multicast address translation router performs IP translation on a multicast packet; or
a distance of the first path, a distance of the second path, a translation distance generated when the multicast address translation router performs IP translation on a multicast packet, an overhead of the first path, an overhead of the second path, and a translation overhead generated when the multicast address translation router performs the IP translation on the multicast packet.

22. The multicast address translation router according to claim 21, wherein:
the multicast address translation router further comprises:
the IPv4 interface, configured to receive a Protocol Independent Multicast Assert (PIM Assert) packet that carries the distance of the first path and/or the overhead of the first path; and
the IPv6 interface, configured to receive a Protocol Independent Multicast Assert (PIM Assert) packet that carries the distance of the second path and/or the overhead of the second path; and
the processor executable instructions further cause the at least one hardware processor to implement:
determine the translation distance and/or translation overhead;
or
preconfigure the translation distance and/or translation overhead in the multicast address translation router.

23. The multicast address translation router according to claim 21, wherein:

when a multicast join request packet that is received by the multicast address translation router and for requesting the first multicast data packet or the second multicast data packet is an IPV6 packet and a multicast address of the multicast join request packet is an IPv6 multicast address obtained by performing IP version translation on an IPv4 multicast address, the processor executable instructions further cause the at least one hardware processor to:

(1) determine a distance calculation value of the first path according to the distance of the first path and the translation distance; and determine the shorter path and the non-shorter path between the first path and the second path according to the distance calculation value of the first path and the distance of the second path;

or (2) determine an overhead calculation value of the first path according to the overhead of the first path and the translation overhead; and determine the shorter path and the non-shorter path between the first path and the second path according to the overhead calculation value of the first path and the overhead of the second path;

or (3) determine a distance calculation value of the first path according to the distance of the first path and the translation distance;

determine an overhead calculation value of the first path according to the overhead of the first path and the translation overhead;

determine a first comprehensive calculation value according to the distance calculation value of the first path and the overhead calculation value of the first path;

determine a second comprehensive calculation value according to the distance of the second path and the overhead of the second path; and determine the shorter path and the non-shorter path between the first path and the second path according to the first comprehensive calculation value and the second comprehensive calculation value.

24. The multicast address translation router according to claim 21, wherein when the multicast join request packet that is received by the multicast address translation router and for requesting the first multicast data packet or the second multicast data packet is an IPv4 packet, the processor executable instructions further cause the at least one hardware processor to:

(1) determine a distance calculation value of the second path according to the distance of the second path and the translation distance; and determine the shorter path and the non-shorter path between the first path and the second path according to the distance calculation value of the second path and the distance of the first path;

(2) determine an overhead calculation value of the second path according to the overhead of the second path and the translation overhead; and determine the shorter path and the non-shorter path between the first path and the second path according to the overhead calculation value of the second path and the overhead of the first path;

or (3) determine a first comprehensive calculation value according to the distance of the first path and the overhead of the first path;

determine a distance calculation value of the second path according to the distance of the second path and the translation distance;

determine an overhead calculation value of the second path according to the overhead of the second path and the translation overhead;

determine a second comprehensive calculation value according to the distance calculation value of the second path and the overhead calculation value of the second path; and determine the shorter path between the first path and the second path according to the first comprehensive calculation value and the second comprehensive calculation value.

* * * * *